UNITED STATES PATENT OFFICE.

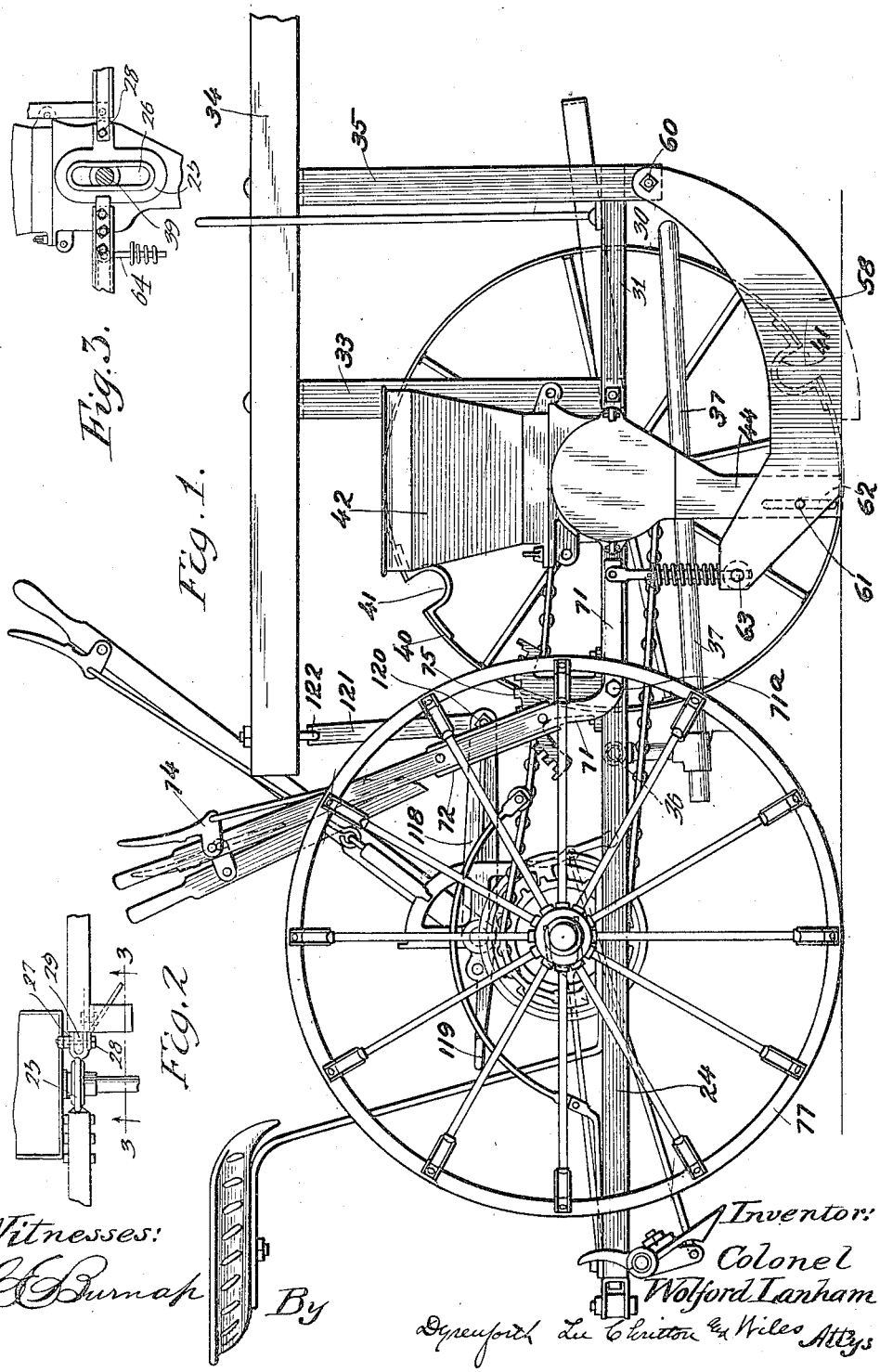

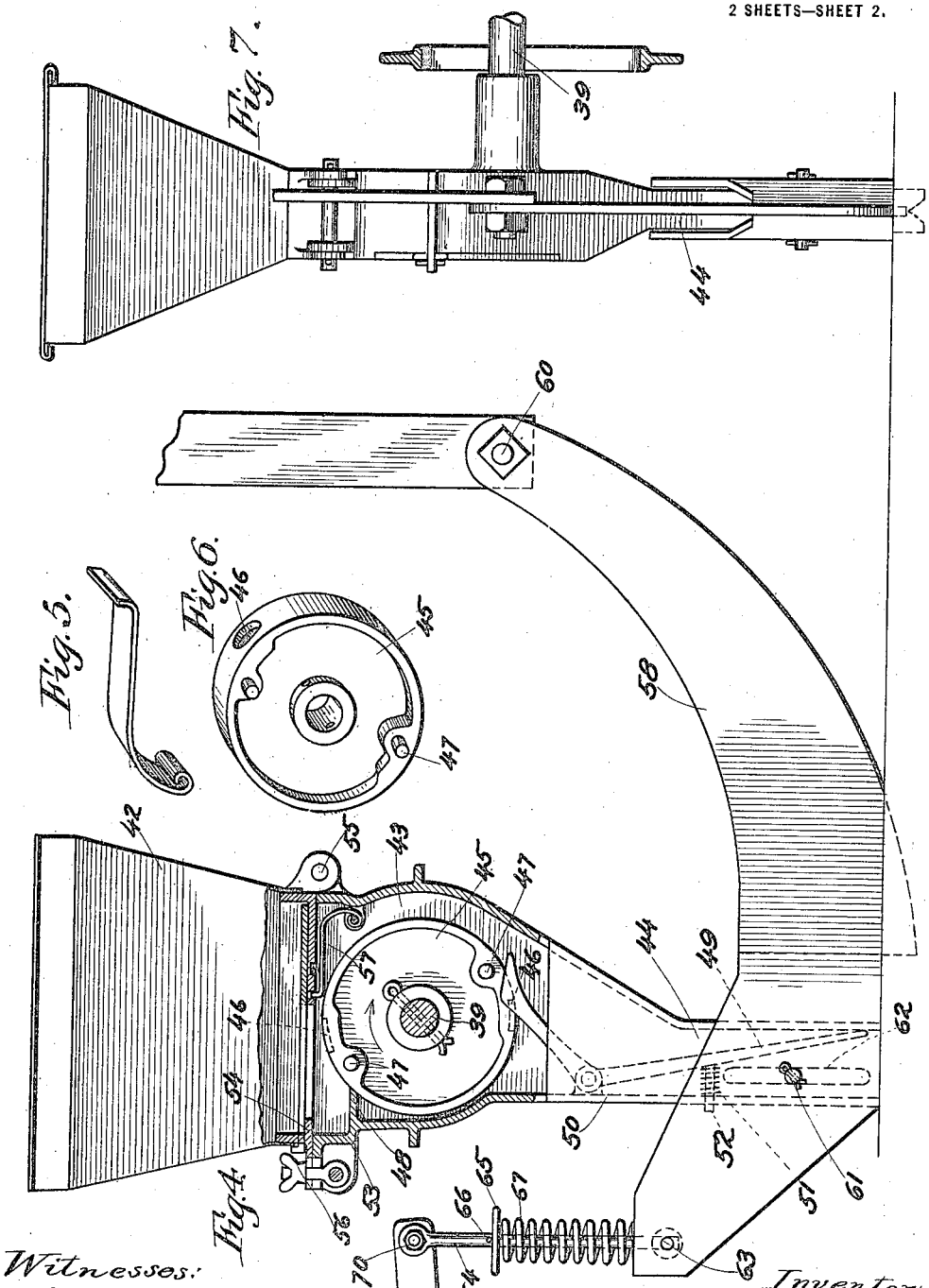

COLONEL WOLFORD LANHAM, OF CHICAGO, ILLINOIS.

CORN-PLANTER.

1,304,992.

Specification of Letters Patent.   Patented May 27, 1919.

Application filed December 5, 1917, Serial No. 205,662.   Renewed April 11, 1919.   Serial No. 289,410.

*To all whom it may concern:*

Be it known that I, COLONEL WOLFORD LANHAM, a citizen of the United States, residing at Chicago, in the county of Cook and State of Illinois, have invented a new and useful Improvement in Corn-Planters, of which the following is a specification.

My invention relates to improvements in corn-planters, of the so-called wireless checkrower type, which involves generally stated a marking-wheel adapted to travel along the ground, corn-dropping mechanism with furrow-openers to plant the corn in the ground at points opposite the marks made by the marking-wheels, and driving mechanism for the marking-wheel and corn-dropping mechanisms.

Generally stated, my object is to so improve upon corn-planters of the above-mentioned type, as hitherto provided, that the mechanism will be simplified, the operation of the structure will be more positive and the machine will be better adapted to perform the functions for which it is provided, my object, more specifically stated, being to provide in a machine wherein the marking-wheel is on a shaft which is connected with the corn-droppers and this shaft is mounted to rise and fall on the main frame, connections between the corn-dropping devices and the furrow-openers for preferably performing the double function of holding the corn-dropping mechanisms against rotation and preventing the separation of the corn-chutes from the furrow-openers in case of extreme relative movement vertically between the furrow-openers and the corn-chutes.

Referring to the accompanying drawings, Figure 1 is a view in side elevation of a machine embodying my invention. Fig. 2 is a plan view of the connection between the main frame and the forward supplementary frame of the machine, this connection being provided at each side of the machine. Fig. 3 is a section taken at the line 3 on Fig. 2 and viewed in the direction of the arrow. Fig. 4 is a broken, enlarged, view, in side elevation, partly sectional, of one of the similar mechanisms for opening up the furrows and depositing seed therein. Fig. 5 is a perspective view of a spring member forming a part of the mechanism shown in Fig. 4. Fig. 6 is a perspective view of a rotatable seed-feeding disk, forming a part of this mechanism; and Fig. 7, a view in front elevation of the mechanism shown in Fig. 4.

The main frame of the machine is formed, generally stated, of a yoke frame, the forwardly extending arms of which are represented at 24, these arms at their forward extremities being equipped with the members 25 containing substantially vertically disposed arc-shaped slots 26. The forward extremities of the members 25 are bifurcated, as represented at 27, and are pivotally connected, as indicated at 28, with ears 29 provided on the rear ends of a frame 30, the side members of which are represented at 31. The tongue of the machine is represented at 34, this tongue being connected with the upper ends of the frame member 33 which is upwardly arched, and the arched member 35.

The main frame of the machine is provided with a shaft 36 which extends transversely thereof and on which a yoke-shaped frame 37 is journaled to permit its forward end to rise and fall, this frame carrying end bearings (not shown), in which the shaft 39 extending crosswise of the machine is journaled, this shaft having non-rotatably mounted thereon, a marking-wheel 40, which would contain marking elements such as the notches indicated at 41. The ends of the shaft 39 extend through the slots 26 beyond which the shaft is associated with other parts to form corn-dropping mechanisms. The corn-dropping mechanism is duplicated at opposite ends of the shaft 39 and, therefore, a description of the one mechanism will suffice. The mechanism just referred to comprises a hopper 42 which opens into a chamber 43 beneath it, the lower portion of this chamber terminating in a chute section 44 open at its lower end. The shaft 39 extends into the chamber 43 wherein it supports in a non-rotatable manner, a disk member 45 provided at diametrically opposed points in its periphery with seed pockets 46 and with laterally extending pins 47. The disk 43 moves in substantial contact with a partition 48 in the casing 43 and in its rotation is adapted to carry the seed pockets 46 into communication with the open bottom of the hopper 42 and thence discharge the seeds into the chamber 43 from whence they drop into the chute 44, and into the space formed between the front wall of the chute section 44 and a valve 49, the latter normally closing the lower end of the chute. This valve is in the form of a bell-crank lever pivoted at 50 in the chute and normally held in closed position by means of a spring 51 encircling a stud 52 on this lever and bearing at opposite ends against the valve 49 and the adjacent wall of the chute 44. The upper end of this bell-crank lever is adapted to be engaged by the pins 47 in the rotation of the disk 45, these pins serving to rock this lever on its pivot 50 and intermittently open the bottom of the chute 44 to permit the seeds to drop into the furrows made by the furrow-openers, as hereinafter described. The upper portion of the structure shown in Fig. 7 is preferably formed of the sections 53 and 54, the section 53 being united with the section 54 along the line above the upper edge of the disk 45, these two sections being pivotally connected at 55 and releasably held together at their opposite edges by the clamp device 56. By this construction, the disk is made to correctly fit within the chamber 43 to properly perform the seed-feeding function, and the clamping of the section 54 to the section 53 by varying degrees of pressure, cannot affect the operation of the disk 45. At the discharge side of the opening from the hopper 42 into the chamber 43 is a spring 57 which coöperates with the periphery of the disk 45 and serves to limit the number of kernels of corn carried over in the pockets 46 for discharge into the chamber 43.

In the operation of a machine of this character, it is desirable that the dropping of the corn upon the ground be simultaneous with the making of the marks by the marking-wheel, and to effect such result, the pins 47 are so arranged relative to the marks on the marking-wheel that the valve 49 will be opened at the proper time to cause the seed to fall upon the ground when the mark is being made. It will be noted that the front wall of the lower part of the chute 44 is substantially in the same vertical line as the shaft 39 and thus in the constructing of the machine, the constructor may readily provide for the insuring of the simultaneous operations by lining up the portions 41 and 47 with the vertical line passing through the shaft 39.

Coöperating with the corn-dropping mechanisms above described are furrow-openers 58 in the form of chutes, presenting the spaced side walls 59 at their rear edges. The forward ends of the chutes 58 are pivotally connected at 60 with the lower ends of the arched bar 35 and at their rear portions straddle the lower ends of the seed-chutes 44 (Fig. 7). The spaced walls 59 of these chutes carry cross-pins 61 which extend through vertical slots 62 in the opposite walls of the seed-chutes 44 for a purpose hereinafter explained. The rear ends of the chutes 58 are pivotally connected as indicated at 63, with the lower ends of links 64, one at each side of the machine, these links extending guidingly through cross-pins 63 which latter are journaled at their ends in the rear ends of the plates forming the openers 58. Each link 64 carries a washer 65 with a cotter pin 66 above it and has a cotter pin (not shown) below the pin 63, and between the cross-pin 63 and washer 65 is a coil spring 67 which yieldingly presses the furrow-opener downwardly against the ground. The upper end of the link is pivotally connected at 70 with the forward end of a bell-crank lever 71 pivoted at 71ª on the main frame of the machine and formed of a single piece of metal, as illustrated in Fig. 1, with a member 72 secured thereto and carrying a pawl 73 actuated by releasing mechanism 74 in accordance with common practice, this pawl coöperating with a toothed segment 75 on the main frame of the machine. This lever mechanism, one of which is provided at each side of the machine for coöperation with the respective furrow-openers 58, is provided for regulating the degree of penetration of the furrow-openers into the ground, this being effected by rocking the lever 72 on its pivot 71ª forwardly or backwardly, depending upon whether the opener is to be adjusted upwardly or downwardly.

The main, supporting and furrow-closing, wheels are located at the rear end of the machine at opposite sides thereof, the wheel at one side of the machine being represented at 77. Certain mechanical connections are provided between the marking-wheel shaft and the main supporting wheels with controlling devices therefor, for positively connecting together the drive wheels and marking-wheel and at the same time providing for a differential movement of the main supporting wheels, but as such mechanism forms no part of the invention sought to be covered herein, illustration and description thereof appear to be unnecessary.

The operation of the above-described mechanism is as follows:

In the drawing of the machine across the field, during which operation the marking-wheel shaft 39 is operatively connected with the driving wheels 77, thus rotating this shaft, the corn is automatically carried from the hoppers 42 into the feeding disks 45 and thence into the chutes of the corn-dropping mechanisms and against the valves 49 which, by the action of the pins 47, operate to intermittently open the valves 49, dropping the seed into the ground simultaneously with the marking of the ground between the rows being planted, by the engagement with the ground of the marking elements represented at 41 on the wheel 40, thus planting the corn in hills equidistantly spaced apart across the field with the marks made by the marking-wheel in line with the planted corn, the furrow-openers 58 operating, as the machine travels over the ground, to form furrows in the ground in advance of the dropping of the seed and the wheels 77 serving the usual purpose of closing the furrows after the seed has been deposited.

While I have illustrated and described a particular embodiment of my invention, I do not wish to be understood as intending to limit it thereto as the same may be variously modified and altered without departing from the spirit of my invention.

What I claim as new and desire to secure by Letters Patent is—

1. In a corn-planter, the combination of corn-dropping mechanism involving a casing through which the corn is intermittently fed and a corn-feeding member operating in said casing, a shaft pivotally supporting said casing and supporting said member, a furrow-opener, and means for preventing rotation of said casing formed of coöperating elements on said casing and furrow-opener.

2. In a corn-planter, the combination of corn-dropping mechanism involving a casing through which the corn is intermittently fed and a corn-feeding member operating in said casing, a shaft pivotally supporting said casing and supporting said member, a furrow-opener, and means for preventing rotation of said casing formed of a pin and slot connection between said casing and furrow-opener.

3. In a corn-planter, the combination of corn-dropping mechanism involving a casing through which the corn is fed intermittently and a rotary member in said casing for feeding the corn, said casing being pivotally supported on said member, a shaft supporting and operating said member, a furrow-opener and means for preventing rotation of said casing formed of coöperating elements on said casing and furrow-opener.

4. In a corn-planter, the combination of corn-dropping mechanism involving a casing through which the corn is intermittently fed, and a corn-feeding member operating in said casing, a shaft pivotally supporting said casing and supporting said member, a frame, a furrow-opener connected with said frame to swing up and down at the portion thereof adjacent said casing, and means for preventing rotation of said casing formed of coöperating elements on said casing and furrow-opener arranged to permit of said movement of said furrow-opener independently of said casing.

5. In a corn-planter, the combination of a main frame, a frame extending forwardly from said main frame and pivoted thereto, a marker wheel shaft adapted to move up and down, corn-dropping mechanism involving a casing through which the corn is intermittently fed, and a corn-feeding member operating in said casing, said shaft pivotally supporting said casing and supporting said member, a furrow-opener connected with said second-named frame to move up and down thereon at the portion thereof adjacent said casing, and means for preventing rotation of said casing formed of coöperating elements on said casing and furrow-opener arranged to permit of said movement of said furrow-opener independently of said casing.

6. In a corn-planter, the combination of corn-dropping mechanism involving a casing through which the corn is intermittently fed, and a corn-feeding member operating in said casing, a shaft pivotally supporting said casing and supporting said member, a frame, a furrow-opener connected with said frame to swing up and down at the portion thereof adjacent said casing and straddling the latter, and means for preventing rotation of said casing formed of coöperating elements on said casing and furrow-opener arranged to permit of said movement of said furrow-opener independently of said casing.

7. In a corn-planter, the combination of corn-dropping mechanism involving a casing through which the corn is intermittently fed, and a corn-feeding member operating in said casing, a shaft pivotally supporting said casing and supporting said member, a frame, a furrow-opener connected with said frame to swing up and down at the portion thereof adjacent said casing, spring means carried by said first-named frame and yieldingly urging said furrow-opener in a downward direction, and means for preventing rotation of said casing formed of coöperating elements on said casing and furrow-opener arranged to permit of said movement of said furrow-opener independently of said casing.

COLONEL WOLFORD LANHAM.